(12) United States Patent
Zhang et al.

(10) Patent No.: US 11,217,990 B2
(45) Date of Patent: Jan. 4, 2022

(54) OVERCURRENT AND OVERVOLTAGE PROTECTION CIRCUIT, ELECTROMAGNETIC INDUCTION TYPE WIRELESS POWER SUPPLY SYSTEM AND COOKING APPLIANCE

(71) Applicant: FOSHAN SHUNDE MIDEA ELECTRICAL HEATING APPLIANCES MANUFACTURING CO., LTD., Foshan (CN)

(72) Inventors: Fan Zhang, Foshan (CN); Yunfeng Wang, Foshan (CN); Jun Lei, Foshan (CN); Shufeng Huang, Foshan (CN); Deyong Jiang, Foshan (CN); Wenhua Liu, Foshan (CN); Lutian Zeng, Foshan (CN)

( * ) Notice: Subject to any disclaimer, the term of this patent is extended or adjusted under 35 U.S.C. 154(b) by 22 days.

(21) Appl. No.: 16/757,355

(22) PCT Filed: Nov. 16, 2017

(86) PCT No.: PCT/CN2017/111336
§ 371 (c)(1),
(2) Date: Apr. 17, 2020

(87) PCT Pub. No.: WO2019/080212
PCT Pub. Date: May 2, 2019

(65) Prior Publication Data
US 2021/0194241 A1 Jun. 24, 2021

(30) Foreign Application Priority Data

Oct. 24, 2017 (CN) .......................... 201721383967.8

(51) Int. Cl.
*H02H 7/00* (2006.01)
*H02H 7/20* (2006.01)
(Continued)

(52) U.S. Cl.
CPC ............ *H02H 7/20* (2013.01); *H02H 1/0007* (2013.01); *H02J 50/12* (2016.02); *H05B 6/062* (2013.01)

(58) Field of Classification Search
None
See application file for complete search history.

(56) References Cited

U.S. PATENT DOCUMENTS

| 10,186,909 B2 * | 1/2019 | Kanno | ..................... H02J 50/12 |
| 10,707,698 B2 * | 7/2020 | Joye | ........................ H02J 50/12 |

(Continued)

FOREIGN PATENT DOCUMENTS

| CN | 203434667 U | 2/2014 |
| CN | 203840598 U | 9/2014 |

(Continued)

OTHER PUBLICATIONS

International Search Report dated Jul. 25, 2018 in the corresponding International Application No. PCT/CN2017/111336.
Office Action of KR Application No. 10-2020-7011210.

*Primary Examiner* — Stephen W Jackson
(74) *Attorney, Agent, or Firm* — Kilpatrick Townsend & Stockton, LLP

(57) ABSTRACT

Provided are an overcurrent and overvoltage protection circuit, an electromagnetic induction type wireless power supply system and a cooking appliance. The overcurrent and overvoltage protection circuit includes a current detecting unit that outputs a current detection value by detecting a resonance current of a resonant transmitting unit a voltage detecting unit that outputs a voltage detection value by detecting a resonance voltage of the resonant transmitting unit and a main control unit including a current detecting end and a voltage detecting end, and the current detecting end is connected to an output end of the current detecting unit, the voltage detecting end is connected to an output end of the
(Continued)

voltage detecting unit, and when the current detection value exceeds a preset current limit and/or the voltage detection value exceeds a preset voltage limit.

8 Claims, 2 Drawing Sheets

(51) Int. Cl.
*H02J 50/12* (2016.01)
*H02H 1/00* (2006.01)
*H05B 6/06* (2006.01)

(56) References Cited

U.S. PATENT DOCUMENTS

| | | | |
|---|---|---|---|
| 11,005,304 B2 * | 5/2021 | Maniktala | ............... H02J 50/60 |
| 2012/0293900 A1 | 11/2012 | Kim et al. | |
| 2012/0306287 A1 | 12/2012 | Kim et al. | |
| 2015/0001956 A1 | 1/2015 | Saen et al. | |

FOREIGN PATENT DOCUMENTS

| | | | |
|---|---|---|---|
| CN | 204290504 U | 4/2015 | |
| CN | 104836441 A | 8/2015 | |
| EP | 2615717 A2 | 7/2013 | |
| JP | 2009130416 A | 6/2009 | |
| JP | 2015029404 A | 2/2015 | |
| JP | 2015104164 A | 6/2015 | |
| KR | 20120128527 A | 11/2012 | |

\* cited by examiner

OVERCURRENT AND OVERVOLTAGE PROTECTION CIRCUIT, ELECTROMAGNETIC INDUCTION TYPE WIRELESS POWER SUPPLY SYSTEM AND COOKING APPLIANCE

CROSS-REFERENCES TO RELATED APPLICATIONS

The present disclosure is a national phase application of International Application No. PCT/CN2017/111336, filed on Nov. 16, 2017, which claims the priority of Chinese Application No. 201721383967.8, filed in the Chinese Patent Office on Oct. 24, 2017, the entireties of which are herein incorporated by reference.

FIELD

The present disclosure relates to the field of household appliances and in particular to an overcurrent and overvoltage protection circuit of an electromagnetic induction type wireless power supply system, an electromagnetic induction type wireless power supply system and a separated cooking appliance.

BACKGROUND

Due to the advantage of wireless connection, the wireless power supply technology prevents the structural design from being limited by wire connection, and therefore will be applied more and more in the future. For example, in the household appliance industry, a detachable cooker cover such as a cooker cover of an electric pressure cooker may be powered to achieve functions such as temperature detection and pressure detection for covering, while a separated heating platform may be used for realizing the wireless power supply for a carrier part.

The wireless power supply is realized through an alternating current inverter system, power is controlled to be closed-loop, overcurrent and overvoltage are very likely to occur, and therefore, a corresponding protection circuit is required to be additionally provided to make the system more reliable.

SUMMARY

The present disclosure aims to at least solve one of problems in the relevant technology to some extent. Therefore, one embodiment of the present disclosure is to provide an overcurrent and overvoltage protection circuit for an electromagnetic induction type wireless power supply system, by which overvoltage and overcurrent protection for the electromagnetic induction type wireless power supply system may be realized.

Another embodiment of the present disclosure is to provide an electromagnetic induction type wireless power supply system.

In yet another of the present disclosure is to provide a separated cooking appliance.

In order to achieve the above-mentioned embodiments, the first aspect of the present disclosure provides an overcurrent and overvoltage protection circuit of an electromagnetic induction type wireless power supply system. The electromagnetic induction type wireless power supply system includes a wireless power supply end and a wireless receiving end; the wireless power supply end includes a resonant transmitting unit, a driving unit driving the reso- nant transmitting unit to perform a resonance operation and a main control unit; the main control unit controls the driving unit to adjust the transmission power of the resonant transmitting unit; and the overcurrent and overvoltage protection circuit includes: a current detecting unit, which is connected to the resonant transmitting unit, and outputs a current detection value by detecting a resonance current of the resonant transmitting unit; and a voltage detecting unit which is connected to the resonant transmitting unit, and outputs a voltage detection value by detecting a resonance voltage of the resonant transmitting unit; and the main control unit includes a current detecting end and a voltage detecting end, the current detecting end is connected to an output end of the current detecting unit, the voltage detecting end is connected to an output end of the voltage detecting unit, and when the current detection value exceeds a preset current limit and/or the voltage detection value exceeds a preset voltage limit, the main control unit controls the driving unit to tune down the transmission power of the resonant transmitting unit or controls the resonant transmitting unit to stop the resonance operation.

According to the overcurrent and overvoltage protection circuit of the electromagnetic induction type wireless power supply system provided by the present disclosure, the current detecting unit outputs the current detection value by detecting the resonance current of the resonant transmitting unit, the voltage detecting unit outputs the voltage detection value by detecting the resonance voltage of the resonant transmitting unit, and when the current detection value exceeds the preset current limit and/or the voltage detection value exceeds the preset voltage limit, the main control unit controls the driving unit to tune down the transmission power of the resonant transmitting unit or controls the resonant transmitting unit to stop the resonance operation, so that the overvoltage and overcurrent protection for the electromagnetic induction type wireless power supply system is realized.

In detail, the driving unit includes a coil driving circuit, a first switch tube and a second switch tube, a control signal receiving end of the coil driving circuit is connected to the main control unit, a first driving output end of the coil driving circuit is connected to a control end of the first switch tube, a second driving output end of the coil driving circuit is connected to a control end of the second switch tube, one end of the first switch tube is connected to a power supply, the other end of the first switch tube is connected to one end of the second switch tube and is provided with a first node, and the other end of the second switch tube is connected to the resonant transmitting unit.

In detail, the resonant transmitting unit includes a resonant capacitor and a wireless transmitting coil, one end of the resonant capacitor is connected to the first node, the other end of the resonant capacitor is connected to one end of the wireless transmitting coil, and the other end of the wireless transmitting coil is connected to the other end of the second switch tube.

In detail, the current detecting unit includes: a current detecting resistor, one end of the current detecting resistor being connected to the wireless transmitting coil in the resonant transmitting unit and being provided with a second node, and the other end of the current detecting resistor being grounded; a first resistor, one end of the first resistor being connected to the second node; an operational amplifier, a positive input end of the operational amplifier being connected to the other end of the first resistor, a negative input end of the operational amplifier being grounded through a second resistor, and an output end of the operational amplifier being used as the output end of the current detecting unit; a first capacitor, one end of the first capacitor being separately connected to the other end of the first resistor and the positive input end of the operational amplifier, and the other end of the first capacitor being grounded; and a third resistor, the third resistor being connected between the negative input end and the output end of the operational amplifier.

In detail, the voltage detecting unit includes: a first diode, the anode of the first diode being separately connected to the resonant capacitor and the wireless transmitting coil in the resonant transmitting unit; a fourth resistor, one end of the fourth resistor being connected to the cathode of the first diode; a fifth resistor, one end of the fifth resistor being connected to the other end of the fourth resistor and being provided with a third node, and the other end of the fifth resistor being grounded, and the third node is used as the output end of the voltage detecting unit; and a second capacitor, the second capacitor being connected in parallel to the fifth resistor.

The wireless power supply end further includes a communication demodulation circuit, the communication demodulation circuit is connected between the main control unit and the coil driving circuit, and the main control unit receives communication information fed back by the wireless receiving end through the communication demodulation circuit.

In order to achieve the above-mentioned embodiments, the second aspect of the present disclosure provides an electromagnetic induction type wireless power supply system including the above-mentioned overcurrent and overvoltage protection circuit.

The electromagnetic induction type wireless power supply system provided by the present disclosure may realize overvoltage and overcurrent protection through the above-mentioned overcurrent and overvoltage protection circuit.

In order to achieve the above-mentioned embodiments, the third aspect of the present disclosure provides a separated cooking appliance including the above-mentioned electromagnetic induction type wireless power supply system.

In detail, the wireless power supply end is arranged in a cooker body of the separated cooking appliance, and the wireless receiving end is arranged in a cooker cover of the separated cooking appliance.

Further, the separated cooking appliance is a separated electric rice cooker or separated electric pressure cooker.

The separated cooking appliance provided by the present disclosure may realize overvoltage and overcurrent protection through the above-mentioned electromagnetic induction type wireless power supply system, and furthermore, the safety and reliability of a product are improved.

DETAILED DESCRIPTION OF THE DISCLOSURE

Hereinafter, embodiments of the present disclosure are described in detail, and examples of the embodiments are shown in the accompanying drawings, and the same or similar numeral symbols always denote the same or similar elements or elements with the same or similar functions. The embodiments described below with reference to the accompanying drawings are exemplary and are intended to explain the present disclosure, but cannot be understood as limitations to the present disclosure.

An overcurrent and overvoltage protection circuit of an electromagnetic induction type wireless power supply system, the electromagnetic induction type wireless power supply system and a separated cooking appliance provided according to the embodiments of the present disclosure are described below with reference to the accompanying drawings.

Figure 1:
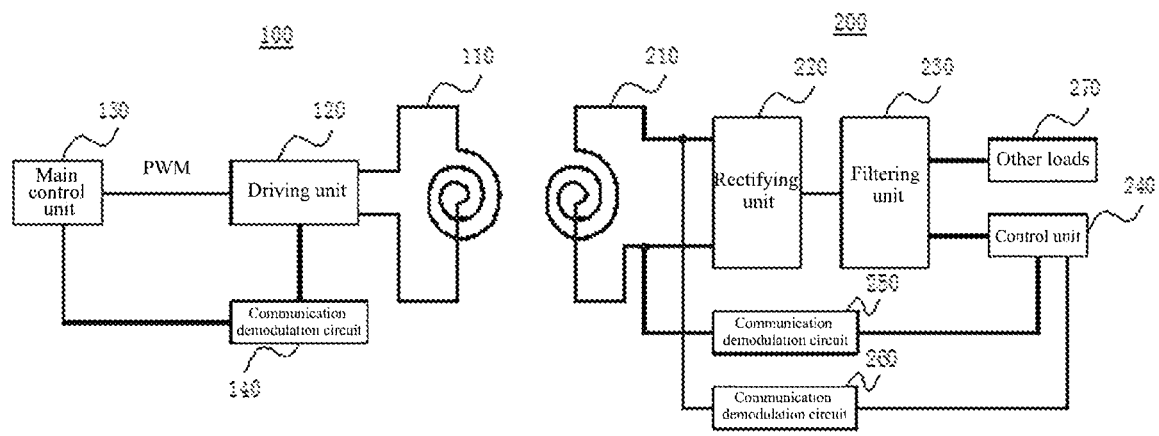
FIG. 1 is a schematic structural diagram of an electromagnetic induction type wireless power supply system according to an embodiment of the present disclosure.

FIG. 1 is a schematic structural diagram of an electromagnetic induction type wireless power supply system according to an embodiment of the present disclosure. As shown in FIG. 1, the electromagnetic induction type wireless power supply system in the embodiment of the present disclosure includes a wireless power supply end 100 and a wireless receiving end 200, for example, in a separated electric pressure cooker, the wireless power supply end 100 may be arranged in a cooker body, and the wireless receiving end 200 may be arranged in a cooker cover.

The wireless power supply end 100 includes a resonant transmitting unit 110, a driving unit 120 driving the resonant transmitting unit 110 to perform a resonance operation and a main control unit 130, and the main control unit 130 controls the driving unit 120 to adjust the transmission power of the resonant transmitting unit 110. The wireless receiving end 200 includes a resonant receiving unit 210, a rectifying unit 220, a filtering unit 230 and a control unit 240, and when the electromagnetic induction type wireless power supply system operates, the main control unit 130 controls the driving unit 120 (such as an alternating current inverter circuit) to make the resonant transmitting unit 110 (such as a transmitting coil and a resonant capacitor) generate an alternating electromagnetic field, so that the resonant receiving unit 210 (such as a receiving coil and a resonant capacitor) of the wireless receiving end 200 generate an induced voltage, a stabilized direct current is obtained after recitification and filtering are performed by the rectifying unit 220 and the filtering unit 230, and then, the power is supplied to other loads 270 (such as a pressure sensor and a temperature sensor in the cooker cover). In one embodiment, supplying power to other loads 270 or not may be controlled by the control unit 240.

Figure 2:
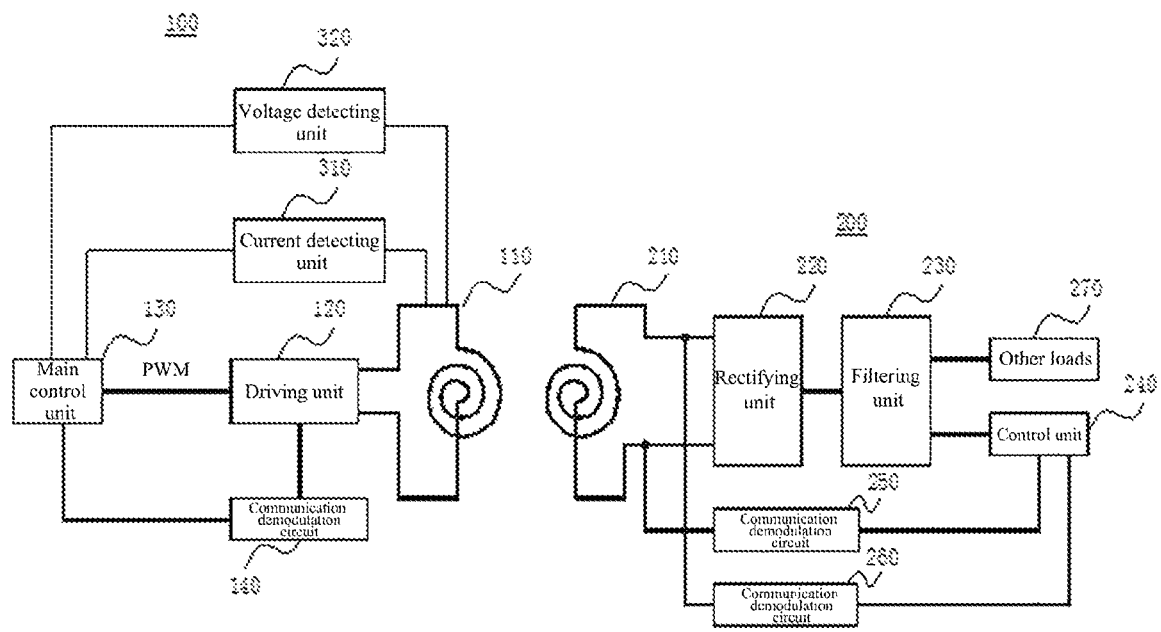
FIG. 2 is a schematic structural diagram of an electromagnetic induction type wireless power supply system with an overcurrent and overvoltage protection circuit according to an embodiment of the present disclosure.

FIG. 2 is a schematic structural diagram of an electromagnetic induction type wireless power supply system with an overcurrent and overvoltage protection circuit according to an embodiment of the present disclosure. As shown in FIG. 2, the overcurrent and overvoltage protection circuit includes a current detecting unit 310 and a voltage detecting unit 320.

The current detecting unit 310 is connected to the resonant transmitting unit 110, and the current detecting unit 310 outputs a current detection value by detecting a resonance current of the resonant transmitting unit 110; and the voltage detecting unit 320 is connected to the resonant transmitting unit 110, and the voltage detecting unit 320 outputs a voltage detection value by detecting a resonance voltage of the resonant transmitting unit 110. The main control unit 130 includes a current detecting end and a voltage detecting end, the current detecting end is connected to an output end of the current detecting unit 310, the voltage detecting end is connected to an output end of the voltage detecting unit 320, and when the current detection value exceeds a preset current limit and/or the voltage detection value exceeds a preset voltage limit, the main control unit 130 controls the driving unit 120 to tune down the transmission power of the resonant transmitting unit 110 or controls the resonant transmitting unit 110 to stop the resonance operation.

For example, when the resonance current of the resonant transmitting unit 110 exceeds a predetermined value and is smaller than the highest current limit or the resonance voltage of the resonant transmitting unit 110 exceeds a predetermined value and is smaller than the highest voltage limit, the main control unit 130 may control the driving unit 120 to tune down the transmission power of the resonant transmitting unit 110 and thus reduce the resonance voltage and the resonance current of the resonant transmitting unit 110, so that the system is protected, and meanwhile, the system may be enabled to further operate. However, when the resonance current of the resonant transmitting unit 110 exceeds the highest current limit or the resonance voltage exceeds the highest voltage limit, the main control unit 130 will control the resonant transmitting unit 110 to stop the resonance operation, so that the overvoltage and overcurrent protection for the whole system is realized.

Circuit structures of the driving unit 120, the current detecting unit 310 and the voltage detecting unit 320 are described in detail below in combination with the accompanying drawings.

Figure 3:
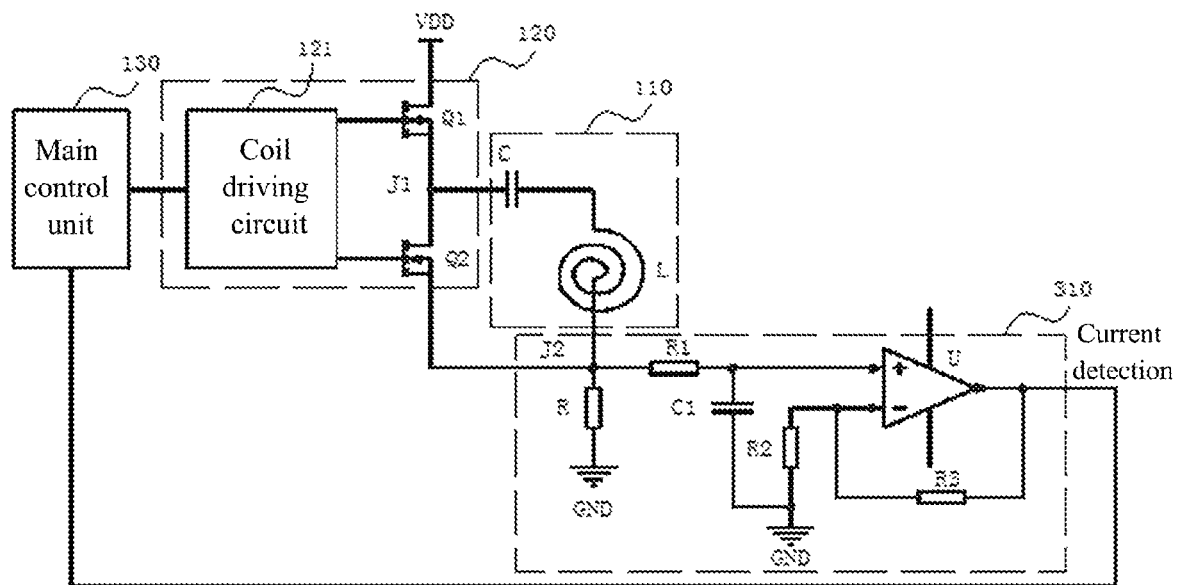
FIG. 3 is a circuit structural diagram of a wireless receiving end with a current detecting unit according to one embodiment of the present disclosure.
Figure 4:
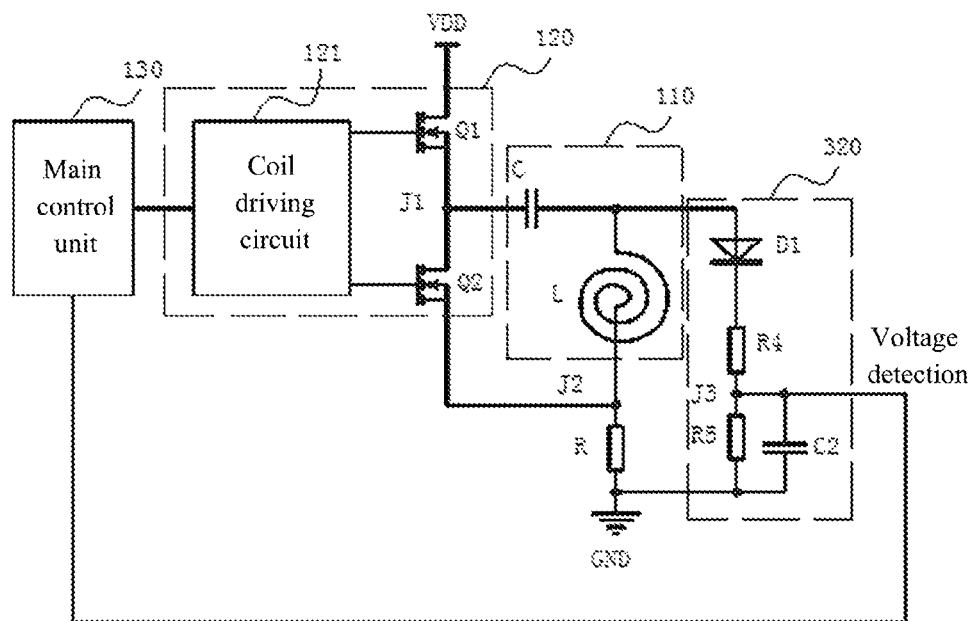
FIG. 4 is a circuit structural diagram of a wireless receiving end with a voltage detecting unit according to one embodiment of the present disclosure.

According to one embodiment of the present disclosure, as shown in FIG. 3 and FIG. 4, the driving unit 120 includes a coil driving circuit 121, a first switch tube Q1 and a second switch tube Q2, a control signal receiving end of the coil driving circuit 121 is connected to the main control unit 130, a first driving output end of the coil driving circuit 121 is connected to a control end of the first switch tube Q1, a second driving output end of the coil driving circuit 121 is connected to a control end of the second switch tube Q2, one end of the first switch tube Q1 is connected to a power supply VDD, the other end of the first switch tube Q1 is connected to one end of the second switch tube Q2 and is provided with a first node J1, and the other end of the second switch tube Q2 is connected to the resonant transmitting unit 110.

Further, as shown in FIG. 3 and FIG. 4, the resonant transmitting unit 110 includes a resonant capacitor C and a wireless transmitting coil L, one end of the resonant capacitor C is connected to the first node J1, the other end of the resonant capacitor C is connected to one end of the wireless transmitting coil L, and the other end of the wireless transmitting coil L is connected to the other end of the second switch tube Q2.

Further, as shown in FIG. 3, the current detecting unit 310 includes: a current detecting resistor R, a first resistor R1, an operational amplifier U, a second resistor R2, a first capacitor C1 and a third resistor R3, and one end of the current detecting resistor R is connected to the wireless transmitting coil L in the resonant transmitting unit 110 and is provided with a second node J2, and the other end of the current detecting resistor R is grounded GND; one end of the first resistor R1 is connected to the second node J2; a positive input end of the operational amplifier U is connected to the other end of the first resistor R1, a negative input end of the operational amplifier U is grounded GND through a second resistor R2, and an output end of the operational amplifier U is used as an output end of a current detecting circuit; one end of the first capacitor C1 is separately connected to the other end of the first resistor R1 and the positive input end of the operational amplifier U, and the other end of the first capacitor C1 is grounded GND; and the third resistor R3 is connected between the negative input end and the output end of the operational amplifier U.

In detail, as shown in FIG. 3, current detection is realized by additionally arranging the current detecting resistor R at one end of the wireless transmitting coil L in the resonant transmitting unit 110, and the detection principle is that: a connection position of the current detecting resistor R makes that power consumed by the resonant transmitting unit 110 may pass through the current detecting resistor R, and therefore, the resonance current of the resonant transmitting unit 110 may be detected by detecting voltages at two ends of the current detecting resistor R. The wireless power supply power is relatively high, and the resonance current is large, but the resistance value of the current detecting resistor R is generally less than 1 ohm due to efficiency and resistor rated power, the current detecting resistor R is relatively small, and therefore, a voltage of the current detecting resistor R is relatively low. Direct detection will result in relatively poor detection precision, so the operational amplifier U is additionally arranged to amplify a weak voltage signal and then AD detection is performed to obtain a relatively accurate current detection value.

Overcurrent detection may be performed after the main control unit 130 obtains the current detection value, and when the current detection value exceeds a current limit, the main control unit 130 controls the driving unit 120 to tune down the transmission power of the resonant transmitting unit 110 or controls the resonant transmitting unit 110 to stop the resonance operation.

Further, as shown in FIG. 4, the voltage detecting unit 320 includes: a first diode D1, a fourth resistor R4, a fifth resistor R5 and a second capacitor C2, and the anode of the first diode D1 is separately connected to the resonant capacitor C and the wireless transmitting coil L in the resonant transmitting unit 110; one end of the fourth resistor R4 is connected to the cathode of the first diode D1; one end of the fifth resistor R5 is connected to the other end of the fourth resistor R4 and is provided with a third node J3, and the other end of the fifth resistor R5 is grounded, and the third node J3 is used as the output end of the voltage detecting unit; and the second capacitor C2 is connected in parallel to the fifth resistor R5.

In detail, as shown in FIG. 4, voltage detection is realized by the additionally arranged first diode D1, fourth resistor R4, fifth resistor R5 and second capacitor C2, and the detection principle is that: when the wireless power supply system operates, an alternating voltage may be generated on the wireless transmitting coil L in the resonant transmitting unit 110, and the voltage is rectified through the first diode D1 and is divided through the fourth resistor R4 and the fifth resistor R5, so that a high voltage is divided into a low voltage which may be identified by the main control unit 130, meanwhile, the low voltage is filtered through the second capacitor C2 to obtain a stabilized direct current, and the main control unit 130 may detect the resonance voltage of the resonant transmitting unit 110 by detecting the voltage.

Overvoltage protection may be performed after the main control unit 130 obtains the voltage detection value, and when the voltage detection value exceeds a voltage limit, the main control unit 130 controls the driving unit 120 to tune down the transmission power of the resonant transmitting unit 110 or controls the resonant transmitting unit 110 to stop the resonance operation.

Therefore, the overvoltage and overcurrent protection for the system may be realized through the above-mentioned voltage detecting unit and current detecting unit.

In addition, for the whole electromagnetic induction type wireless power supply system, a transceiving coil is a key device for wireless power supply, and the transceiving coil is fixedly arranged on a circuit board in a plugging or welding way in a production process, by which poor plugging or welding is easy to generate to result in product unreliability, and therefore, it is expected that the system may realize the automatic detection for the state of the transceiving coil to facilitate finding problems and also prevent bad products from entering the market.

In the embodiment of the present disclosure, due to the adoption of the above-mentioned current detecting unit 310 and voltage detecting unit 320, not only can overvoltage and overcurrent protection for the system be realized, but also the automatic detection for the state of the wireless transmitting coil can be realized.

In detail, after detecting the current detection value through the current detecting unit 310, the main control unit 130 judges the current detection value, and if the current detection value is basically equal to 0, it denotes that the wireless transmitting coil L is in an open-circuit state; and if the current detection value is larger than a preset current threshold (the current value when the coil is short-circuit is larger than that when the coil is normal), it denotes that the wireless transmitting coil L is in a short-circuit state, and therefore, whether the coil is in the open-circuit state or the short-circuit state may be judged through the current detection value detected by the current detecting unit 310. When detecting the voltage detection value through the voltage detecting unit 320, the main control unit 130 judges the voltage detection value, and if the voltage detection value is basically equal to 0, it denotes that the wireless transmitting coil L is in a short-circuit state. Therefore, whether the wireless transmitting coil is mounted and is in the open-circuit or short-circuit state may be detected in a current detection way, and the short-circuit situation of the wireless transmitting coil may be detected in a voltage detection way.

For a wireless receiving coil, it should be noted that energy transferred by the wireless transmitting coil may not be received when the problem of poor plugging or welding appears, so that whether the wireless receiving coil has the problem of poor plugging or welding may be judged in a state that a receiving end has no power. Therefore, the automatic detection for the state of the transceiving coil in the system may be realized according to the self-characteristics of the above-mentioned current detecting unit, voltage detecting unit and receiving coil, so that it is convenient to find the problem, and meanwhile, the bad products are prevented from entering the market. Further, as shown in FIG. 1 and FIG. 2, the wireless power supply end 100 further includes a communication demodulation circuit 140, the communication demodulation circuit 140 is connected between the main control unit 130 and the coil driving circuit 121 in the driving unit 120, and the main control unit 130 receives communication information fed back by the wireless receiving end 200 through the communication demodulation circuit 140. For example, the main control unit 130 detects a voltage signal, a current signal, a temperature signal and the like in the driving unit 120 through the communication demodulation circuit 140 (such as a voltage and current collecting circuit and a temperature collecting circuit) to judge the current working state of the driving unit 120 and reasonably controls the coil driving circuit 121 according to the current working state of the driving unit 120. Specific circuit structures may be achieved by adopting the prior art, and the descriptions thereof are omitted herein.

Similarly, as shown in FIG. 1, the wireless receiving end 200 may further include communication demodulation circuits 250 and 260, the communication demodulation circuits 250 and 260 are connected between the resonant receiving unit 210 and the control unit 240, the voltage, current and the like of the resonant receiving unit 210 are respectively detected by the communication demodulation circuits 250 and 260, the control unit 240 controls the filtering unit 230 according to the voltage, current and the like of the resonant receiving unit 210 fed back by the communication demodulation circuits 250 and 260, and the filtering unit 230 may be internally provided with a switch tube and the like for controlling the loads 270 to be electrified to control whether the loads 270 are powered on or not. Specific circuit structures may be achieved by adopting the prior art, and the descriptions thereof are omitted herein.

In conclusion, according to the overcurrent and overvoltage protection circuit of the electromagnetic induction type wireless power supply system in the embodiment of the present disclosure, the current detecting unit outputs the current detection value by detecting the resonance current of the resonant transmitting unit, the voltage detecting unit outputs the voltage detection value by detecting the resonance voltage of the resonant transmitting unit, and when the current detection value exceeds the preset current limit and/or the voltage detection value exceeds the preset voltage limit, the main control unit controls the driving unit to tune down the transmission power of the resonant transmitting unit or controls the resonant transmitting unit to stop the resonance operation, so that the overvoltage and overcurrent protection for the electromagnetic induction type wireless power supply system is realized.

In addition, an embodiment of the present disclosure further provides an electromagnetic induction type wireless power supply system including the above-mentioned overcurrent and overvoltage protection circuit, as shown in FIG. 2, and the descriptions thereof are omitted herein.

The electromagnetic induction type wireless power supply system in the embodiment of the present disclosure may realize overvoltage and overcurrent protection through the above-mentioned overcurrent and overvoltage protection circuit.

In addition, an embodiment of the present disclosure further provides a separated cooking appliance including the above-mentioned electromagnetic induction type wireless power supply system. For example, the separated cooking appliance may be a separated electric rice cooker or separated electric pressure cooker.

The separated cooking appliance provided by the present disclosure may realize overvoltage and overcurrent protection through the above-mentioned electromagnetic induction type wireless power supply system, and furthermore, the safety and reliability of a product are improved.

In the description of the present disclosure, it should be understood that directional or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like are based on directional or positional relationships as shown in the accompanying drawings and are merely intended to facilitate describing the present disclosure and simplifying the description, rather than to indicate or imply that the indicated device or element has to be in a specific direction and be constructed and operated in the specific direction not to be understood as limitations to the present disclosure.

In addition, terms "first" and "second" are for descriptive purposes only, and cannot be understood as indicating or implying the relative importance or implicitly indicating the number of indicated features. Therefore, the features defined as "first" and "second" may explicitly or implicitly include one or more of the features. In the description of the present disclosure, the meaning of "a plurality of" is two or more such as two and three, unless it may be specifically defined otherwise.

In the present disclosure, terms "mounting", "connected", "connection", "fixedly" and the like should be understood in a broad sense unless otherwise specified and defined, for example, "connection" may be fixed connection or detachable connection or an integral whole, may be mechanical connection or electrical connection, may be direct connection or indirect connection through an intermediate medium, and may be internal connection of two elements or interaction between two elements unless otherwise specified and defined.

In the present disclosure, the first feature located "on" or "under" the second feature may mean that the first feature is in direct contact with the second feature, or the first feature is in indirect contact with the second feature through an intermediate medium. Moreover, the first feature located "over" or "above" and "topside" the second feature may mean that the first feature is located right above or oblique above the second feature or only show that the horizontal height of the first feature is greater than that of the second feature. The first feature located "under", "below" and "underside" the second feature may mean that the first feature is located right below or oblique below the second feature or only show that the horizontal height of the first feature is less than that of the second feature.

In the description of the specification, descriptions with reference to terms "one embodiment", "some embodiments", "example", "specific example" or "some examples" and the like mean that specific features, structures, materials or characteristics described in combination with the embodiments or examples are included in at least one embodiment or example of the present disclosure. In the specification, the schematic statements for the above-mentioned terms are not required to be specific to the same embodiment or example. Moreover, the described specific features, structures, materials or characteristics may be combined in any one or more of the embodiments or examples in an appropriate way.

What is claimed is:

1. An overcurrent and overvoltage protection circuit of an electromagnetic induction type wireless power supply system, comprising:
   a wireless power supply end and a wireless receiving end, the wireless power supply end comprises a resonant transmitting unit, a driving unit driving the resonant transmitting unit to perform a resonance operation and a main control unit, the main control unit controls the driving unit to adjust transmission power of the resonant transmitting unit, and the overcurrent and overvoltage protection circuit comprises:
   a current detecting unit, the current detecting unit being connected to the resonant transmitting unit, and the current detecting unit outputting a current detection value by detecting a resonance current of the resonant transmitting unit; and
   a voltage detecting unit, the voltage detecting unit being connected to the resonant transmitting unit, and the voltage detecting unit outputting a voltage detection value by detecting a resonance voltage of the resonant transmitting unit;
   wherein the main control unit comprises a current detecting end and a voltage detecting end, the current detecting end is connected to an output end of the current detecting unit, the voltage detecting end is connected to an output end of the voltage detecting unit, and when the current detection value exceeds a preset current limit and/or the voltage detection value exceeds a preset voltage limit, the main control unit controls the driving unit to tune down the transmission power of the resonant transmitting unit or controls the resonant transmitting unit to stop the resonance operation;
   wherein the driving unit comprises a coil driving circuit, a first switch tube Q1 and a second switch tube Q2, a control signal receiving end of the coil driving circuit is connected to the main control unit, a first driving output end of the coil driving circuit is connected to a control end of the first switch tube Q1, a second driving output end of the coil driving circuit is connected to a control end of the second switch tube Q2, a first end of the first switch tube Q1 is connected to a power supply VDD, a second end of the first switch tube Q1 is connected to a first end of the second switch tube Q2 and is provided with a first node J1, and a second end of the second switch tube Q2 is connected to the resonant transmitting unit.

2. The overcurrent and overvoltage protection circuit of the electromagnetic induction type wireless power supply system of claim 1, wherein the resonant transmitting unit comprises a resonant capacitor C and a wireless transmitting coil L, a first end of the resonant capacitor C is connected to the first node J1, a second end of the resonant capacitor C is connected to a first end of the wireless transmitting coil L, and a second end of the wireless transmitting coil L is connected to a second end of the second switch tube Q2.

3. The overcurrent and overvoltage protection circuit of the electromagnetic induction type wireless power supply system of claim 1, wherein the current detecting unit comprises:
   a current detecting resistor R, a first end of the current detecting resistor R being connected to a wireless transmitting coil L in the resonant transmitting unit and being provided with a second node J2, and a second end of the current detecting resistor R being grounded GND;
   a first resistor R1, a first end of the first resistor R1 being connected to the second node J2;
   an operational amplifier U, a positive input end of the operational amplifier U being connected to a second end of the first resistor R1, a negative input end of the operational amplifier U being grounded GND through a second resistor R2, and an output end of the operational amplifier U being used as an output end of the current detecting unit;
   a first capacitor C1, a first end of the first capacitor C1 being separately connected to a second end of the first resistor R1 and the positive input end of the operational amplifier U, and a second end of the first capacitor C1 being grounded GND; and a third resistor R3, the third resistor R3 being connected between the negative input end and the output end of the operational amplifier U.

4. The overcurrent and overvoltage protection circuit of the electromagnetic induction type wireless power supply system of claim 3, wherein the voltage detecting unit comprises:

a first diode D1, an anode of the first diode D1 being separately connected to a resonant capacitor C and the wireless transmitting coil L in the resonant transmitting unit;

a fourth resistor R4, a first end of the fourth resistor R4 being connected to a cathode of the first diode D1;

a fifth resistor R5, a first end of the fifth resistor R5 being connected to a second end of the fourth resistor R4 and being provided with a third node J3, and a second end of the fifth resistor R5 being grounded, wherein the third node J3 is used as the output end of the voltage detecting unit; and a second capacitor C2, the second capacitor C2 being connected in parallel to the fifth resistor R5.

5. The overcurrent and overvoltage protection circuit of the electromagnetic induction type wireless power supply system of claim 1, wherein the wireless power supply end further comprises a communication demodulation circuit, the communication demodulation circuit is connected between the main control unit and the coil driving circuit, and the main control unit receives communication information fed back by the wireless power supply end through the communication demodulation circuit.

6. An electromagnetic induction type wireless power supply system, comprising:

an overcurrent and overvoltage protection circuit of an electromagnetic induction type wireless power supply system, wherein the electromagnetic induction type wireless power supply system comprises a wireless power supply end and a wireless receiving end, the wireless power supply end comprises a resonant transmitting unit, a driving unit driving the resonant transmitting unit to perform a resonance operation and a main control unit, the main control unit controls the driving unit to adjust transmission power of the resonant transmitting unit, and the overcurrent and overvoltage protection circuit comprises:

a current detecting unit, the current detecting unit being connected to the resonant transmitting unit, and the current detecting unit outputting a current detection value by detecting a resonance current of the resonant transmitting unit; and a voltage detecting unit, the voltage detecting unit being connected to the resonant transmitting unit, and the voltage detecting unit outputting a voltage detection value by detecting a resonance voltage of the resonant transmitting unit; wherein the main control unit comprises a current detecting end and a voltage detecting end, the current detecting end is connected to an output end of the current detecting unit, the voltage detecting end is connected to an output end of the voltage detecting unit, and when the current detection value exceeds a preset current limit and/or the voltage detection value exceeds a preset voltage limit, the main control unit controls the driving unit to tune down the transmission power of the resonant transmitting unit or controls the resonant transmitting unit to stop the resonance operation;

wherein the driving unit comprises a coil driving circuit, a first switch tube Q1 and a second switch tube Q2, a control signal receiving end of the coil driving circuit is connected to the main control unit, a first driving output end of the coil driving circuit is connected to a control end of the first switch tube Q1, a second driving output end of the coil driving circuit is connected to a control end of the second switch tube Q2, a first end of the first switch tube Q1 is connected to a power supply VDD, a second end of the first switch tube Q1 is connected to a first end of the second switch tube Q2 and is provided with a first node J1, and a second end of the second switch tube Q2 is connected to the resonant transmitting unit.

7. A separated cooking appliance, comprising:

an electromagnetic induction type wireless power supply system, comprising:

an overcurrent and overvoltage protection circuit of an electromagnetic induction type wireless power supply system, wherein the electromagnetic induction type wireless power supply system comprises a wireless power supply end and a wireless receiving end, the wireless power supply end comprises a resonant transmitting unit, a driving unit driving the resonant transmitting unit to perform a resonance operation and a main control unit, the main control unit controls the driving unit to adjust transmission power of the resonant transmitting unit, and the overcurrent and overvoltage protection circuit comprises:

a current detecting unit, the current detecting unit being connected to the resonant transmitting unit, and the current detecting unit outputting a current detection value by detecting a resonance current of the resonant transmitting unit; and a voltage detecting unit, the voltage detecting unit being connected to the resonant transmitting unit, and the voltage detecting unit outputting a voltage detection value by detecting a resonance voltage of the resonant transmitting unit; wherein the main control unit comprises a current detecting end and a voltage detecting end, the current detecting end is connected to an output end of the current detecting unit, the voltage detecting end is connected to an output end of the voltage detecting unit, and when the current detection value exceeds a preset current limit and/or the voltage detection value exceeds a preset voltage limit, the main control unit controls the driving unit to tune down the transmission power of the resonant transmitting unit or controls the resonant transmitting unit to stop the resonance operation;

wherein the wireless power supply end is arranged in a cooker body of the separated cooking appliance, and the wireless receiving end is arranged in a cooker cover of the separated cooking appliance.

8. The separated cooking appliance of claim 7, wherein the separated cooking appliance is a separated electric rice cooker or separated electric pressure cooker.

\* \* \* \* \*